(12) United States Patent
Yamamoto (10) Patent No.: US 11,628,518 B2
(45) Date of Patent: Apr. 18, 2023

(54) WAFER MANUFACTURING APPARATUS

(71) Applicant: DISCO CORPORATION, Tokyo (JP)

(72) Inventor: Setsuo Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 49 days.

(21) Appl. No.: 17/455,522

(22) Filed: Nov. 18, 2021

(65) Prior Publication Data

US 2022/0193826 A1  Jun. 23, 2022

(30) Foreign Application Priority Data

Dec. 17, 2020  (JP) .............................. JP2020-209569

(51) Int. Cl.
*B23K 26/38* (2014.01)
*B23K 37/04* (2006.01)

(52) U.S. Cl.
CPC .............. *B23K 26/38* (2013.01); *B23K 37/04* (2013.01)

(58) Field of Classification Search
CPC ................................ B23K 26/38; B23K 37/04
USPC ...................................... 219/121.72
See application file for complete search history.

(56) References Cited

U.S. PATENT DOCUMENTS

| | | | | |
|---|---|---|---|---|
| 5,368,054 A * | 11/1994 | Koretsky | .......... | H01L 21/67051 134/184 |
| 5,383,483 A * | 1/1995 | Shibano | .................... | B08B 3/12 96/6 |
| 5,540,245 A * | 7/1996 | Munakata | ......... | H01L 21/67028 134/76 |
| 5,934,299 A * | 8/1999 | Akatsu | .............. | H01L 21/67023 134/155 |
| 7,938,131 B2 * | 5/2011 | Hahn | ................ | H01L 21/67051 118/316 |
| 2018/0154543 A1 * | 6/2018 | Hirata | .................... | B26D 7/086 |
| 2019/0160804 A1 * | 5/2019 | Hinohara | .............. | B32B 43/006 |

FOREIGN PATENT DOCUMENTS

| | | | | |
|---|---|---|---|---|
| CN | 109698118 A | * | 4/2019 | ......... B23K 26/0006 |
| DE | 102018202042 A1 | * | 8/2018 | ............. B23K 26/53 |
| DE | 102018208190 A1 | * | 12/2018 | ......... B23K 26/0006 |
| DE | 102019200383 A1 | * | 7/2019 | ......... B23K 26/0006 |
| DE | 102019204233 A1 | * | 10/2019 | ......... B23K 26/0006 |
| JP | 2018133484 A | * | 8/2018 | ......... B23K 26/0853 |
| JP | 2019102513 A | | 6/2019 | |
| JP | 2019161037 A | * | 9/2019 | ............. B23K 20/10 |
| JP | 2019220581 A | * | 12/2019 | ............. B23K 26/38 |

* cited by examiner

*Primary Examiner* — Jimmy Chou
(74) *Attorney, Agent, or Firm* — Greer Burns & Crain Ltd.

(57) ABSTRACT

A wafer manufacturing apparatus includes a chuck table configured to hold an SiC ingot by a suction surface with a wafer to be manufactured on an upper side, an ultrasonic oscillating unit configured to oscillate an ultrasonic wave, a water supply unit, and a peeling unit configured to suck and hold the wafer to be manufactured, and peel the wafer to be manufactured. The chuck table includes a porous plate forming the suction surface and a base supporting the porous plate, and sucks and holds the SiC ingot even in a state in which an area of a second surface of the SiC ingot is smaller than an area of the suction surface, and the water flows on the suction surface exposed on the periphery of the SiC ingot.

3 Claims, 10 Drawing Sheets

WAFER MANUFACTURING APPARATUS

BACKGROUND OF THE INVENTION

Field of the Invention

The present invention relates to a wafer manufacturing apparatus.

Description of the Related Art

Various kinds of electronic device chips such as an integrated circuit (IC), a large scale integration (LSI), a light emitting diode (LED), and a power device are manufactured by forming devices by forming minute circuits on a wafer thinly cut out by a wire saw from a single crystal semiconductor ingot of silicon, sapphire, silicon carbide (SiC), or the like, and cutting out the wafer into the individual chips. However, when the wafer is manufactured by cutting the single crystal semiconductor ingot by the wire saw and polishing a top surface and undersurface of the wafer, 70% to 80% of a volume of the ingot is discarded, which is uneconomical.

In particular, the single crystal SiC ingot has problems in terms of efficient manufacturing of wafers because the single crystal SiC ingot has high hardness, and therefore, it is difficult to cut the single crystal SiC ingot by the wire saw, and a considerable time is taken to cut the single crystal SiC ingot, thus resulting in poor productivity, and because a unit cost of the single crystal SiC ingot is high.

To deal with these problems, a technology (see Japanese Patent Laid-Open No. 2019-102513, for example) has been proposed which forms a separation layer in a planned cutting surface by positioning a condensing point of a laser beam transmissible through the single crystal SiC ingot inside the ingot and applying the laser beam, and separates the wafer.

SUMMARY OF THE INVENTION

There are various types of single crystal SiC ingots having diameters of three inches to six inches, for example. A peeling apparatus disclosed in Japanese Patent Laid-Open No. 2019-102513 uses a chuck table having suction grooves corresponding to the sizes of respective ingots in a suction surface. Therefore, in the peeling apparatus disclosed in Japanese Patent Laid-Open No. 2019-102513, the chuck table needs to be replaced each time the size of an ingot is changed.

It is accordingly an object of the present invention to provide a wafer manufacturing apparatus that can reduce replacement of a chuck table.

In accordance with an aspect of the present invention, there is provided a wafer manufacturing apparatus for manufacturing a wafer from a semiconductor ingot in which a peeling layer is formed by positioning a condensing point of a laser beam of a wavelength transmissible through the semiconductor ingot at a depth corresponding to a thickness of the wafer to be manufactured, and applying the laser beam, the wafer manufacturing apparatus including a chuck table configured to hold the semiconductor ingot on a suction surface with the wafer to be manufactured on an upper side, an ultrasonic oscillating unit having an end surface that faces the wafer to be manufactured, and configured to oscillate an ultrasonic wave, a water supply unit configured to supply water between the wafer to be manufactured and the end surface of the ultrasonic oscillating unit, a peeling unit configured to suck and hold the wafer to be manufactured, and peel the wafer to be manufactured from the semiconductor ingot, and a water receiving unit configured to surround the chuck table, and receive the water discharged after being supplied from the water supply unit to the semiconductor ingot and flowing on the suction surface of the chuck table on a periphery of the semiconductor ingot. The chuck table includes a porous plate forming the suction surface and a base supporting the porous plate and having a communication passage configured to make a negative pressure act on the porous plate, and the chuck table sucks and holds the semiconductor ingot even in a state in which an area of a bottom surface of the semiconductor ingot is smaller than an area of the suction surface and the water flows on the suction surface exposed on the periphery of the semiconductor ingot.

Preferably, the suction surface of the porous plate has a first region corresponding to a first semiconductor ingot having a first diameter and a second region surrounding the first region, communication passages configured to make a negative pressure or a positive pressure act selectively are connected to regions corresponding to the first region and the second region, respectively, in a surface of the porous plate, the surface being on an opposite side from the suction surface, and when the first semiconductor ingot is sucked and held, the negative pressure is made to act by the communication passage connected to the first region, and the positive pressure is made to act by the communication passage connected to the second region.

Preferably, a decompressing pump as a suction source is coupled to the communication passage of the chuck table, a pressure gage is installed on the communication passage, and a difference between measured values of the pressure gage when the decompressing pump is actuated in a state in which nothing is mounted on the suction surface of the porous plate and in a state in which the ingot is placed on the suction surface of the porous plate is equal to or more than 5 kPa.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will hereinafter be described in detail with reference to the drawings. The present invention is not limited by contents described in the following embodiment. In addition, constituent elements described in the following include constituent elements readily conceivable by those skilled in the art and essentially identical constituent elements. Further, configurations described in the following can be combined with each other as appropriate. In addition, various omissions, replacements, or modifications of configurations can be performed without departing from the spirit of the present invention.

Figure 1:
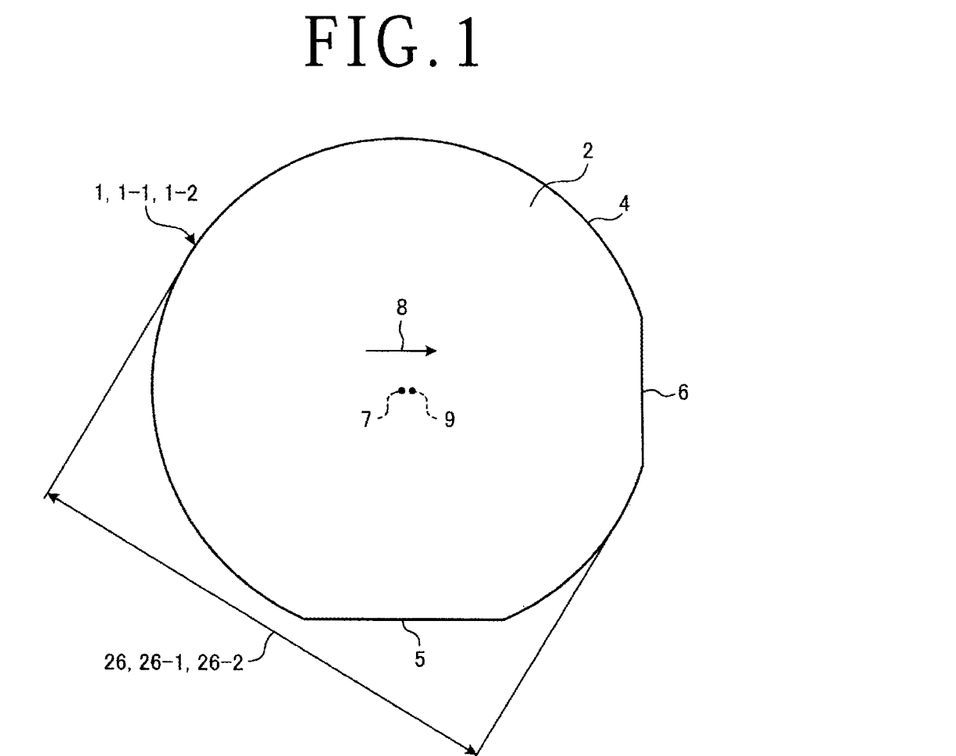
FIG. 1 is a plan view of an SiC ingot as a processing target of a wafer manufacturing apparatus according to an embodiment.
Figure 2:
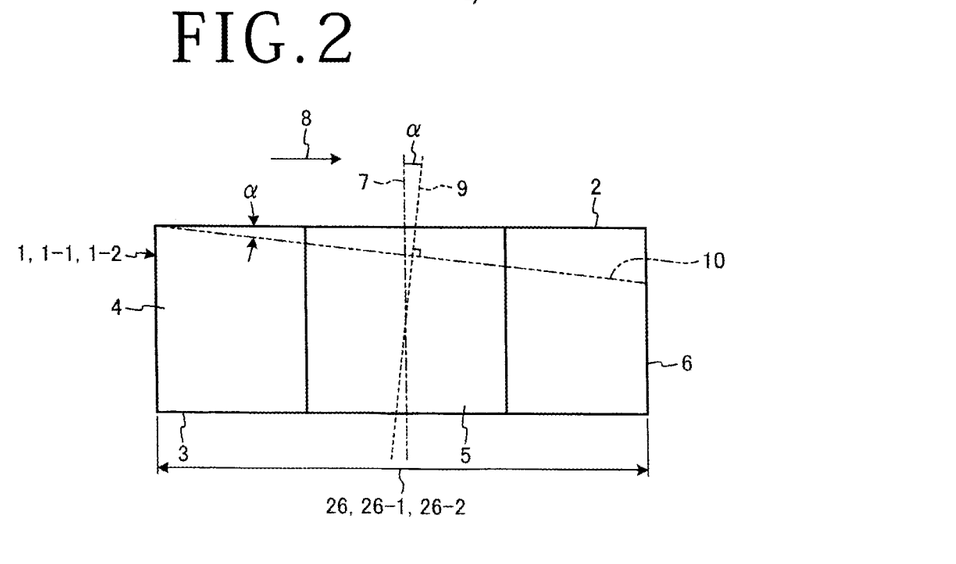
FIG. 2 is a side view of the SiC ingot depicted in FIG. 1.
Figure 3:
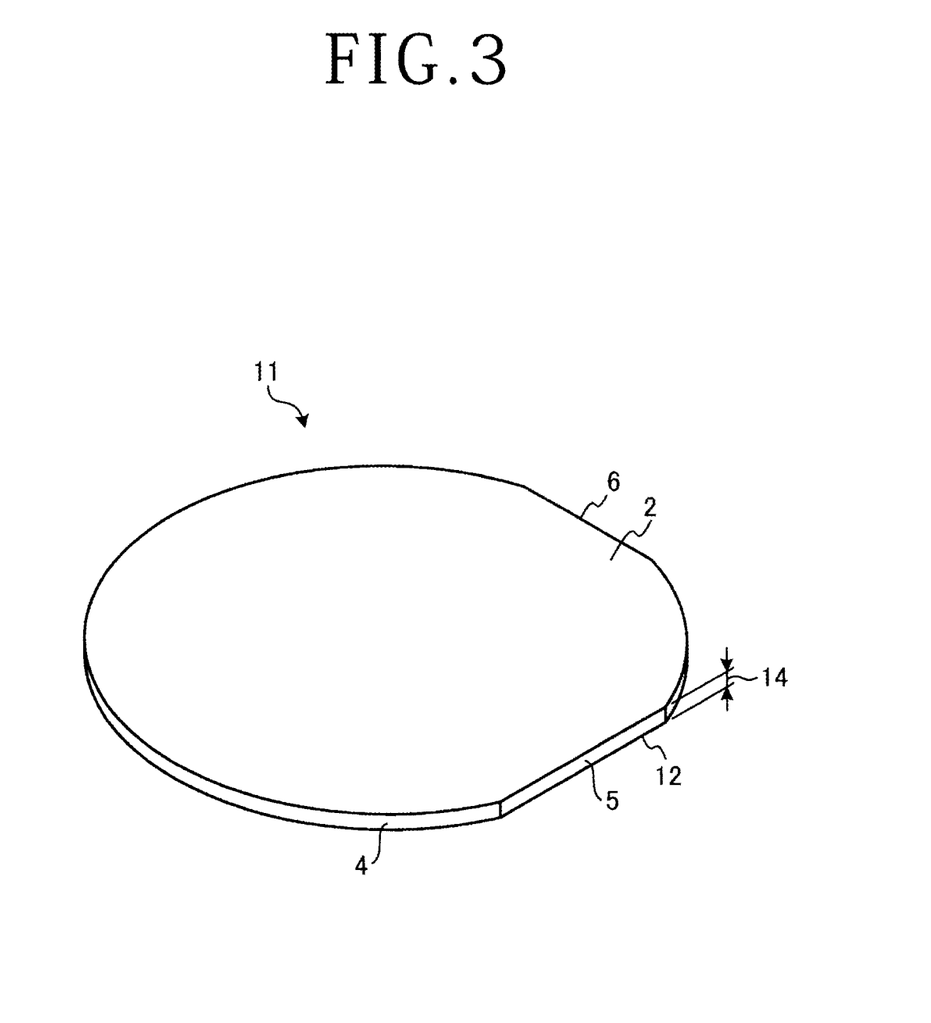
FIG. 3 is a perspective view of a wafer manufactured by the wafer manufacturing apparatus according to the embodiment.
Figure 4:
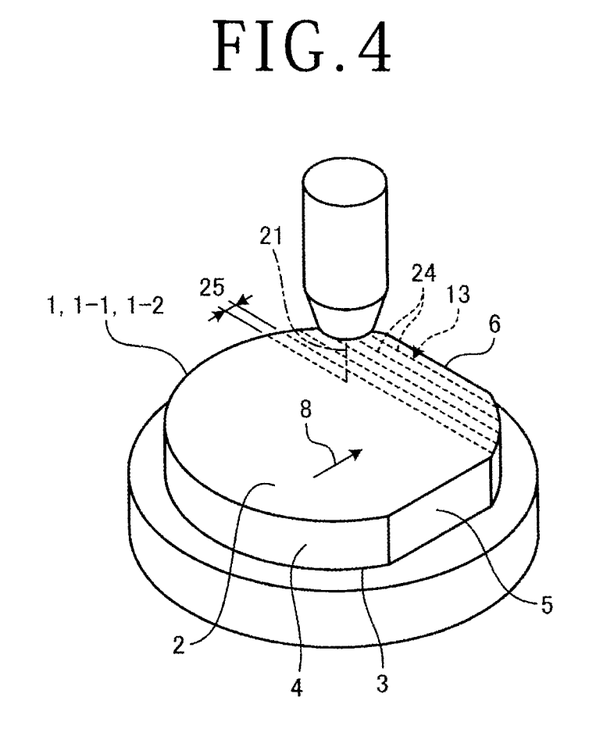
FIG. 4 is a perspective view depicting a state of forming a peeling layer in the SiC ingot depicted in FIG. 1.
Figure 5:
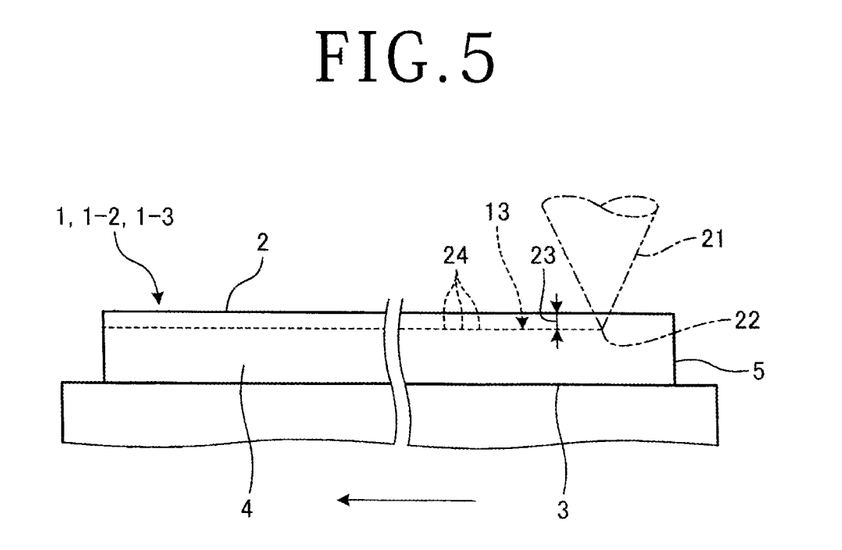
FIG. 5 is a side view depicting a state of forming the peeling layer in the SiC ingot depicted in FIG. 4.

A wafer manufacturing apparatus according to the embodiment of the present invention will be described with reference to the drawings. Description will first be made of an SiC ingot as a processing target ingot of the wafer manufacturing apparatus according to the embodiment. FIG. 1 is a plan view of the SiC ingot as a processing target of the wafer manufacturing apparatus according to the embodiment. FIG. 2 is a side view of the SiC ingot depicted in FIG. 1. FIG. 3 is a perspective view of a wafer manufactured by the wafer manufacturing apparatus according to the embodiment. FIG. 4 is a perspective view depicting a state of forming a peeling layer in the SiC ingot depicted in FIG. 1. FIG. 5 is a side view depicting a state of forming the peeling layer in the SiC ingot depicted in FIG. 4.

The SiC ingot 1 depicted in FIG. 1 and FIG. 2 in the embodiment is formed in a cylindrical shape as a whole. In the embodiment, the SiC ingot 1 is a hexagonal single crystal SiC ingot.

As depicted in FIG. 1 and FIG. 2, the SiC ingot 1 has a first surface 2 as a circular end surface, a circular second surface 3 (corresponding to a bottom surface) on the undersurface side of the first surface 2, and a peripheral surface 4 connected to the outer edge of the first surface 2 and the outer edge of the second surface 3. In addition, the SiC ingot 1 has, on the peripheral surface 4, a first orientation flat 5 indicating a crystal orientation, and a second orientation flat 6 orthogonal to the first orientation flat 5. The length of the first orientation flat 5 is longer than the length of the second orientation flat 6.

In addition, the SiC ingot 1 has a c-axis 9 inclined by an off angle $\alpha$ with respect to a normal 7 to the first surface 2 in an inclination direction 8 toward the second orientation flat 6, and a c-plane 10 orthogonal to the c-axis 9. The c-plane 10 is inclined by the off angle $\alpha$ with respect to the first surface 2 of the SiC ingot 1. The inclination direction 8 of the c-axis 9 from the normal 7 is orthogonal to the extending direction of the second orientation flat 6 and is parallel with the first orientation flat 5. An infinite number of c-planes 10 are set in the SiC ingot 1 on a molecular level of the SiC ingot 1. In the embodiment, the off angle $\alpha$ is set at 1°, 4°, or 6°. However, in the present invention, the SiC ingot 1 can be manufactured with the off angle $\alpha$ freely set in a range of 1° to 6°, for example.

In addition, the first surface 2 of the SiC ingot 1 is formed as a mirror surface by being subjected to polishing processing by a polishing apparatus after a grinding apparatus subjects the first surface 2 to grinding processing.

A wafer 11 depicted in FIG. 3 is manufactured by peeling a part of the SiC ingot 1, and subjecting a surface 12 peeled from the SiC ingot 1 to grinding processing, polishing processing, and the like. After the wafer 11 is peeled off from the SiC ingot 1, devices are formed on the top surface of the wafer 11. In the embodiment, the devices are metal-oxide-semiconductor field-effect transistors (MOSFETs), micro-electromechanical systems (MEMS), or Schottky barrier diodes (SBDs). However, in the present invention, the devices are not limited to MOSFETs, MEMS, and SBDs. Incidentally, the same parts of the wafer 11 as those in the SiC ingot 1 are identified by the same reference numerals, and description thereof will be omitted.

After the SiC ingot 1 depicted in FIG. 1 and FIG. 2 has a peeling layer 13 formed as depicted in FIG. 4 and FIG. 5, the wafer 11 to be manufactured is peeled off from the SiC ingot 1 with the peeling layer 13 as a starting point. The peeling layer 13 is formed inside the SiC ingot 1 by positioning a condensing point 22 (depicted in FIG. 5) of a pulsed laser beam 21 (depicted in FIG. 5) of a wavelength transmissible through the SiC ingot 1 at a depth 23 (depicted in FIG. 5) corresponding to a thickness 14 (depicted in FIG. 3) of the wafer 11 to be manufactured from the first surface 2 of the SiC ingot 1, and applying the pulsed laser beam 21 along the second orientation flat 6.

When the SiC ingot 1 is irradiated with the pulsed laser beam 21 of the wavelength transmissible through the SiC ingot 1, a modified portion 24 in which SiC is separated into silicon (Si) and carbon (C) by the application of the pulsed laser beam 21, the pulsed laser beam 21 applied next is absorbed by C formed previously, and SiC is separated into Si and C in a chained manner is formed inside the SiC ingot 1 along the second orientation flat 6, and a crack extending from the modified portion 24 along the c-plane 10 is generated. Thus, when the SiC ingot 1 is irradiated with the pulsed laser beam 21 of the wavelength transmissible through the SiC ingot 1, the peeling layer 13 is formed which includes the modified portion 24 and the crack formed from the modified portion 24 along the c-plane 10.

After the SiC ingot 1 is irradiated with the laser beam 21 over an entire length in a direction parallel with the second orientation flat 6, the SiC ingot 1 and a laser beam irradiating unit not depicted which applies the laser beam 21 are index-fed relative to each other along the first orientation flat 5. A moving distance 25 of the index feeding at this time is equal to or less than the width of the crack. A peeling layer 13 is formed inside the SiC ingot 1 again by positioning the condensing point 22 at the depth 23 corresponding to the thickness 14 from the first surface 2, and applying the pulsed laser beam 21 along the second orientation flat 6. The operation of irradiating the SiC ingot 1 with the laser beam 21 along the second orientation flat 6 and the operation of index-feeding the laser beam irradiating unit relatively along the first orientation flat 5 are repeated.

Consequently, in the SiC ingot 1, the peeling layer 13 including the modified portion 24 in which SiC is separated into Si and C, and the crack, and decreased in strength than other parts is formed at each moving distance of the index feeding at the depth 23 corresponding to the thickness 14 of the wafer 11 from the first surface 2. In the SiC ingot 1, the peeling layer 13 is formed at each moving distance 25 of the index feeding over the entire length in the direction parallel with the first orientation flat 5 at the depth 23 corresponding to the thickness 14 from the first surface 2.

In addition, there are a plurality of kinds of SiC ingots 1 different in diameter 26. In the embodiment, a wafer manufacturing apparatus 30 manufactures the wafer 11 from, as the SiC ingot 1, a first SiC ingot 1-1 (corresponding to a first ingot) having a first diameter 26-1 and a second SiC ingot 1-2 (corresponding to a second ingot) having a second diameter 26-2 larger than the first diameter 26-1.

(Wafer Manufacturing Apparatus)

Figure 6:
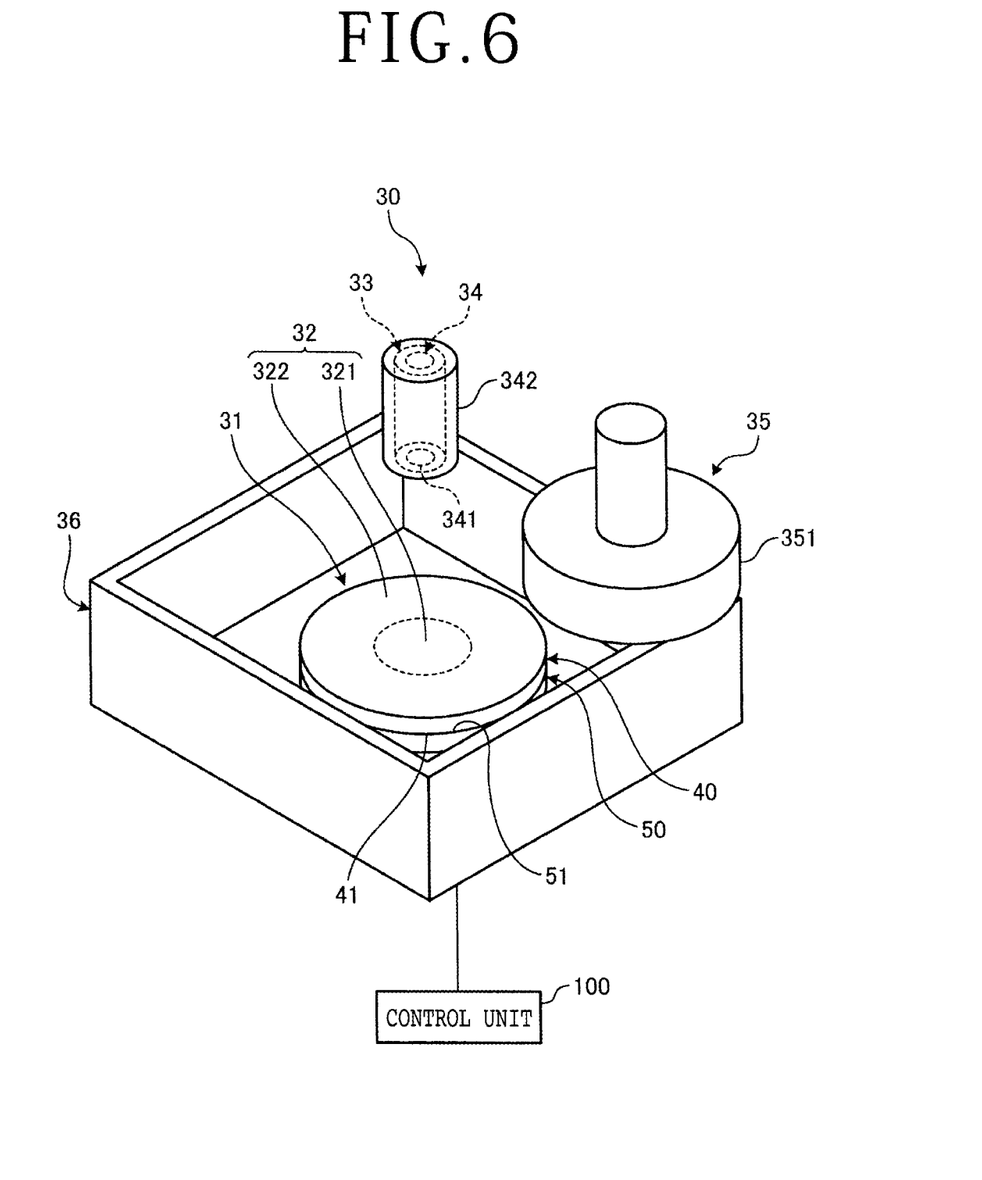
FIG. 6 is a perspective view schematically depicting an example of a configuration of the wafer manufacturing apparatus according to the embodiment.
Figure 7:
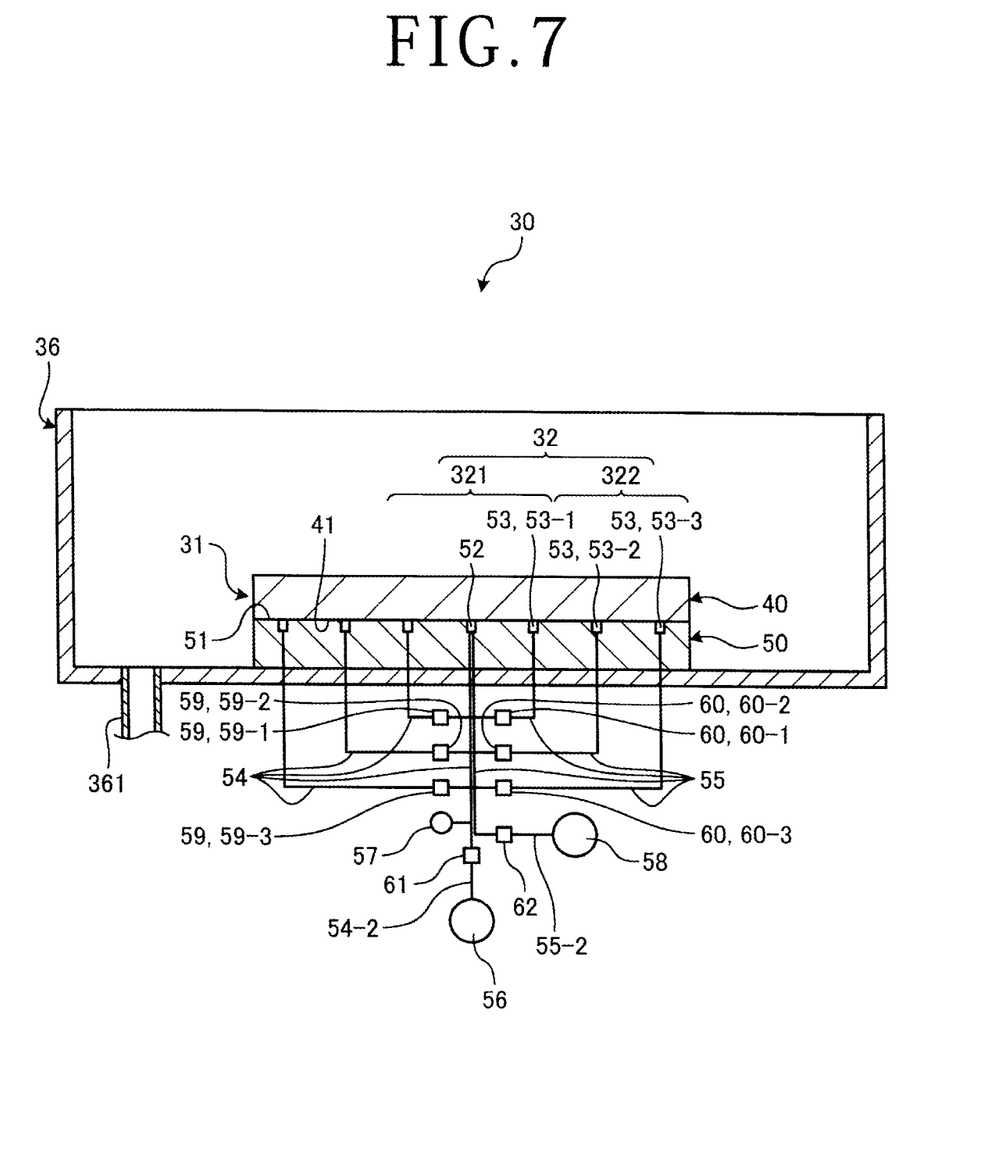
FIG. 7 is a sectional view schematically depicting the wafer manufacturing apparatus depicted in FIG. 6.
Figure 8:
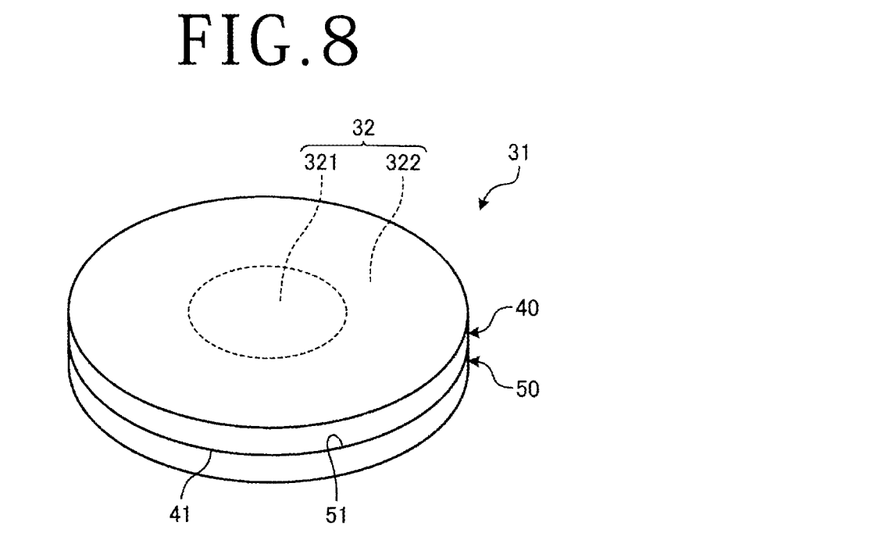
FIG. 8 is a perspective view of a chuck table of the wafer manufacturing apparatus depicted in FIG. 6.
Figure 9:
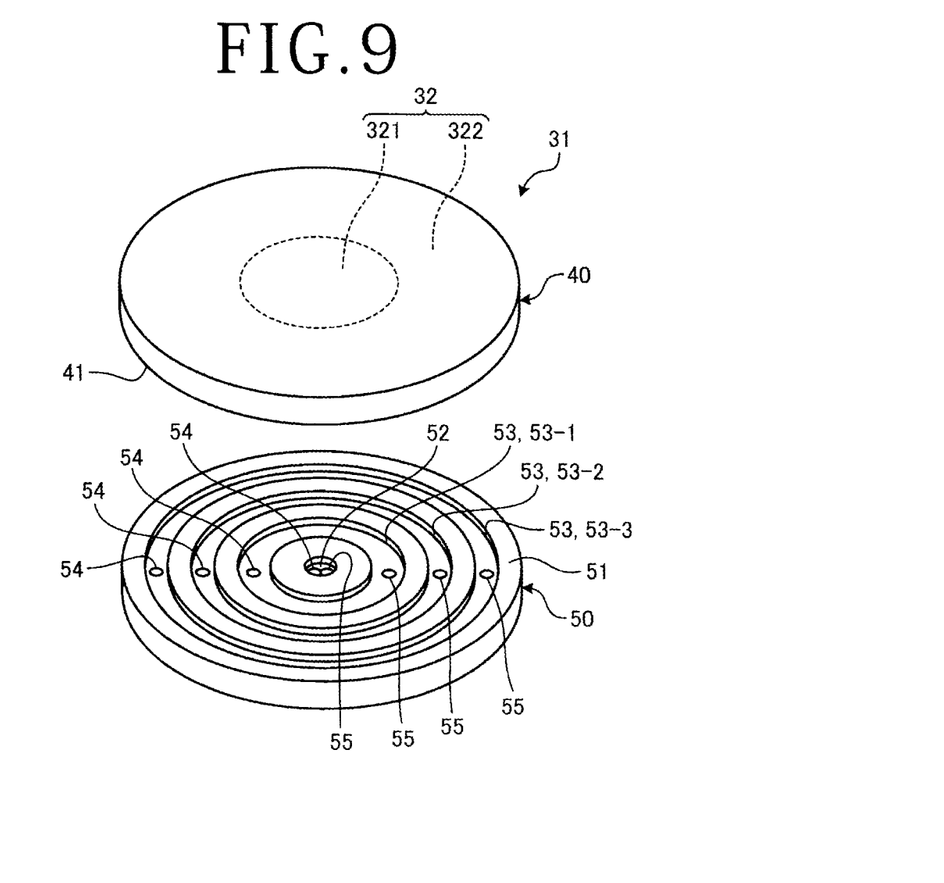
FIG. 9 is an exploded perspective view of the chuck table depicted in FIG. 8.

The wafer manufacturing apparatus will next be described. FIG. 6 is a perspective view schematically depicting an example of a configuration of the wafer manufacturing apparatus according to the embodiment. FIG. 7 is a sectional view schematically depicting the wafer manufacturing apparatus depicted in FIG. 6. FIG. 8 is a perspective view of a chuck table of the wafer manufacturing apparatus depicted in FIG. 6. FIG. 9 is an exploded perspective view of the chuck table depicted in FIG. 8. The wafer manufacturing apparatus 30 according to the embodiment is an apparatus that manufactures the wafer 11 depicted in FIG. 3 by peeling the wafer 11 from the SiC ingot 1-1 or 1-2 in which the peeling layer 13 is formed.

As depicted in FIG. 6 and FIG. 7, the wafer manufacturing apparatus 30 includes a chuck table 31, a water supply unit 33 (depicted only in FIG. 6), an ultrasonic oscillating unit 34 (depicted only in FIG. 6), a peeling unit 35 (depicted only in FIG. 6), a water receiving unit 36, and a control unit 100 (depicted only in FIG. 6).

The chuck table 31 holds the SiC ingot 1-1 or 1-2 with the wafer 11 to be manufactured on an upper side. The upper surface of the chuck table 31 is a suction surface 32 parallel with a horizontal direction. The second surface 3 of the SiC ingot 1-1 or 1-2 is mounted on the suction surface 32, and the chuck table 31 holds the SiC ingot 1-1 or 1-2 by the suction surface 32 with the first surface 2 oriented upward. Incidentally, a detailed configuration of the chuck table 31 will be described later.

The water supply unit 33 supplies water 331 (depicted in FIG. 10) between the wafer 11 to be manufactured and an end surface 341 of the ultrasonic oscillating unit 34. The water supply unit 33 is a tube that supplies, from a lower end thereof, the water 331 supplied from a water supply source not depicted. The water supply unit 33 in the embodiment supplies the water 331 onto the first surface 2 of the SiC ingot 1-1 or 1-2 held on the chuck table 31. Incidentally, in the embodiment, the water supply unit 33 is provided in a casing 342 of the ultrasonic oscillating unit 34, and supplies the water 331 from the outside of the end surface 341 of the ultrasonic oscillating unit 34.

The ultrasonic oscillating unit 34 is housed in the casing 342. The ultrasonic oscillating unit 34 has the end surface 341 facing the wafer 11 to be manufactured of the SiC ingot 1-1 or 1-2 held on the chuck table 31. The ultrasonic oscillating unit 34 oscillates an ultrasonic wave, and applies the oscillated ultrasonic wave to the SiC ingot 1-1 or 1-2. The end surface 341 of the ultrasonic oscillating unit 34 faces the first surface 2 of the SiC ingot 1-1 or 1-2 held on the chuck table 31 along a direction orthogonal to the suction surface 32 and the first surface 2.

The ultrasonic oscillating unit 34 includes an ultrasonic vibrator and a horn having the end surface 341 facing the wafer 11 to be manufactured. The ultrasonic vibrator is, for example, formed by a well-known piezoelectric element. Power is applied from a power supply not depicted to the ultrasonic vibrator, so that the ultrasonic vibrator vibrates along the above-described orthogonal direction at a frequency equal to or higher than 20 kHz and equal to or lower than several gigahertz with an amplitude of several micrometers to several tens of micrometers (which vibration will hereinafter be written as an ultrasonic vibration). The horn is formed in a columnar shape, and is fixed to an end surface of the ultrasonic vibrator which end surface is nearer the suction surface 32.

The ultrasonic oscillating unit 34 applies an ultrasonic wave by having the end surface 341 immersed in the water 331 (depicted in FIG. 10) supplied by the water supply unit 33 onto the first surface 2 of the SiC ingot 1-1 or 1-2 held on the chuck table 31, ultrasonically vibrating the end surface 341 by the ultrasonic vibration of the ultrasonic vibrator, and thereby ultrasonically vibrating the first surface 2 of the SiC ingot 1-1 or 1-2 via the water 331. In addition, in the embodiment, the water supply unit 33 and the ultrasonic oscillating unit 34 are provided so as to be raisable and lowerable by a raising and lowering mechanism not depicted.

The peeling unit 35 sucks and holds the wafer 11 to be manufactured of the SiC ingot 1-1 or 1-2 to which the ultrasonic wave is applied, and peels the wafer 11 from the SiC ingot 1-1 or 1-2. The peeling unit 35 includes a transporting pad 351 that sucks and holds the wafer 11 to be manufactured on a lower surface thereof and a moving unit not depicted which freely moves the transporting pad 351 in the horizontal direction and raises or lowers the transporting pad 351 above the chuck table 31. The moving unit moves the transporting pad 351 along the horizontal direction between a position above the chuck table 31 and a position retracted from above the chuck table 31.

The water receiving unit 36 surrounds the chuck table 31. The water receiving unit 36 receives the water 331 discharged after being supplied from the water supply unit 33 to the SiC ingot 1-1 or 1-2 and flowing on the suction surface 32 of the chuck table 31 on the periphery of the SiC ingot 1-1 or 1-2. In the embodiment, the water receiving unit 36 is formed in a box shape having a closed bottom and provided with an opening in an upper portion thereof, has the chuck table 31 installed on the bottom, and surrounds the chuck table 31. As depicted in FIG. 7, a discharge port 361 that discharges the water 331 to the outside opens in the bottom of the water receiving unit 36.

As depicted in FIG. 7, FIG. 8, and FIG. 9, the chuck table 31 includes a porous plate 40 and a base 50. The upper surface of the porous plate 40 forms the suction surface 32, and the porous plate 40 is formed in a disc shape whose outside diameter is larger than the second diameter 36-2 of the second SiC ingot 1-2 and whose thickness is uniform. Therefore, the area of the second surface 3 of the SiC ingot 1-1 or 1-2 is smaller than the area of the suction surface 32 of the chuck table 31.

The porous plate 40 is formed by a porous ceramic as a porous material. In the embodiment, the porous ceramic of the porous plate 40 is, for example, manufactured by mixing alumina abrasive grains of a predetermined size, a frit, and a liquid adhesive, and firing the mixture at 600° C. to 1300° C. after pressing the mixture into a disc shape.

As a result of the manufacture by the manufacturing method as described above, the porosity of the porous ceramic forming the porous plate 40 is equal to or more than 40% and equal to or less than 70% as a volume ratio, and the diameter of vent holes formed by pores is equal to or more than 10 μm and equal to or less than 25 μm. In the embodiment, the porous plate 40 is adjusted such that, in a case where a decompressing pump 56 (depicted in FIG. 7) as a suction source connected to the chuck table 31 is operated in a state in which nothing is mounted on the suction surface 32, a pressure value measured by a pressure gage 57 provided to a merged communication passage 54-2 to be described later is in a predetermined range smaller than the value of a conventional configuration. In the embodiment, the predetermined range is between −65 kPa (gage pressure) and −20 kPa (gage pressure), for example.

In addition, in the embodiment, the suction surface 32 of the porous plate 40 has a first region 321 (region of the suction surface 32 which region is on the inside of a dotted line in FIG. 6, FIG. 8, FIG. 9, or the like) corresponding to the first SiC ingot 1-1 and a second region 322 (region of the suction surface 32 which region is on the outside of the dotted line in FIG. 6, FIG. 8, FIG. 9, or the like) surrounding the first region 321. In the embodiment, the planar shape of the first region 321 and the second region 322 is a circular shape coaxial with the planar shape of the suction surface 32. In addition, in the embodiment, the diameter of the first region 321 is the same as the first diameter 26-1 of the first SiC ingot 1-1.

Therefore, the first region 321 is mounted with the first SiC ingot 1-1 when the suction surface 32 holds the first SiC ingot 1-1. The first region 321 and the second region 322 are mounted with the second SiC ingot 1-2 when the suction surface 32 holds the second SiC ingot 1-2. Incidentally, while a boundary between the first region 321 and the second region 322 is indicated by the dotted line in FIG. 6, FIG. 8, FIG. 9, or the like, the boundary between the first region 321 and the second region 322 is not indicated on the suction surface 32 of an actual porous plate 40.

The base 50 supports the porous plate 40. The base 50 includes communication passages 54 that make a negative pressure act on the porous plate 40. In the embodiment, the base 50 is formed of a metal such as stainless steel, is formed in a disc shape whose outside diameter is equal to the outside diameter of the porous plate 40 and whose thickness is uniform, and is installed at the center of the bottom of the water receiving unit 36.

The base 50 supports the porous plate 40 with the porous plate 40 mounted on an upper surface 51 parallel with the horizontal direction. Therefore, the upper surface 51 of the base 50 is mounted with a surface 41 of the porous plate 40 which surface is on an opposite side from the suction surface 32. A central recessed portion 52 whose planar shape is a circular shape and a plurality of annular recessed portions 53 in a ring shape are formed in the upper surface 51 of the base 50.

In the embodiment, the central recessed portion 52 and the plurality of annular recessed portions 53 are formed at positions coaxial with the upper surface 51 of the base 50. In the embodiment, the diameter of the central recessed portion 52 is smaller than the diameter of the first region 321. In the embodiment, three annular recessed portions 53 are formed in the upper surface 51. However, in the present invention, the number of annular recessed portions 53 formed in the upper surface 51 is not limited to three. Incidentally, in the following, the three annular recessed portions 53 will be described as a first annular recessed portion 53-1, a second annular recessed portion 53-2, and a third annular recessed portion 53-3 in order from the inside.

The inside diameter and outside diameter of the first annular recessed portion 53-1 are larger than the diameter of the central recessed portion 52 and are smaller than the diameter of the first region 321. The inside diameter and outside diameter of the second annular recessed portion 53-2 are larger than the inside diameter and outside diameter of the first annular recessed portion 53-1 and the diameter of the first region 321. The inside diameter and outside diameter of the third annular recessed portion 53-3 are larger than the inside diameter and outside diameter of the second annular recessed portion 53-2 and the diameter of the first region 321.

The communication passages 54 each have one end opening in the respective bottoms of the central recessed portion 52, the first annular recessed portion 53-1, the second annular recessed portion 53-2, and the third annular recessed portion 53-3, and have another end communicating with the confluent communication passage 54-2 as one communication passage. The confluent communication passage 54-2 is coupled to the decompressing pump 56. The communication passages 54 and the confluent communication passage 54-2 are formed by flow passages formed in the base 50 or a pipe connected to the base 50, or the like.

The communication passages 54 make a negative pressure act on the porous plate 40 mounted on the base 50 by being sucked by the decompressing pump 56, and suck and hold the porous plate 40 on the base 50 and suck and hold the SiC ingot 1-1 or 1-2 on the suction surface 32 by making the negative pressure act on the porous plate 40. Incidentally, the communication passages 54 having one ends connected to the central recessed portion 52 and the first annular recessed portion 53-1 are communication passages connected to the first region 321.

Incidentally, in the embodiment, the decompressing pump 56 is formed by a water-sealed vacuum pump. In addition, in the embodiment, the pressure gage 57 that measures an atmospheric pressure in the confluent communication passage 54-2 is installed on the confluent communication passage 54-2. The pressure gage 57 outputs a measurement result to the control unit 100.

In addition, one ends of positive pressure communication passages 55 as communication passages open in the respective bottoms of the central recessed portion 52, the first annular recessed portion 53-1, the second annular recessed portion 53-2, and the third annular recessed portion 53-3. Other ends of the positive pressure communication passages 55 communicate with one confluent positive pressure communication passage 55-2. The confluent positive pressure communication passage 55-2 is coupled to a positive pressure source 58. The positive pressure communication passages 55 and the confluent positive pressure communication passage 55-2 are formed by flow passages formed in the base 50 or a pipe connected to the base 50, or the like. The positive pressure communication passages 55 make a positive pressure act on the porous plate 40 mounted on the base 50 by being supplied with a gas pressurized by the positive pressure source 58, and make a gas jetted from the vent holes opening in the suction surface 32 of the porous plate 40 by making the positive pressure act on the porous plate 40. Incidentally, the positive pressure communication passages 55 whose one ends are connected to the second annular recessed portion 53-2 and the third annular recessed portion 53-3 are communication passages connected to the second region 322.

In addition, the communication passages 54 whose one ends open in the respective bottoms of the first annular recessed portion 53-1, the second annular recessed portion 53-2, and the third annular recessed portion 53-3 are each provided with an opening and closing valve 59. Incidentally, in the following, the opening and closing valve 59 provided to the communication passage 54 whose one end opens in the bottom of the first annular recessed portion 53-1 will be described as a first opening and closing valve 59-1, the opening and closing valve 59 provided to the communication passage 54 whose one end opens in the bottom of the second annular recessed portion 53-2 will be described as a second opening and closing valve 59-2, and the opening and closing valve 59 provided to the communication passage 54 whose one end opens in the bottom of the third annular recessed portion 53-3 will be described as a third opening and closing valve 59-3.

In addition, the positive pressure communication passages 55 whose one ends open in the respective bottoms of the first annular recessed portion 53-1, the second annular recessed portion 53-2, and the third annular recessed portion 53-3 are each provided with an opening and closing valve 60. Incidentally, in the following, the positive pressure opening and closing valve 60 provided to the positive pressure communication passage 55 whose one end opens in the bottom of the first annular recessed portion 53-1 will be described as a first positive pressure opening and closing valve 60-1, the opening and closing valve 60 provided to the positive pressure communication passage 55 whose one end opens in the bottom of the second annular recessed portion 53-2 will be described as a second positive pressure opening and closing valve 60-2, and the opening and closing valve 60 provided to the positive pressure communication passage 55 whose one end opens in the bottom of the third annular recessed portion 53-3 will be described as a third positive pressure opening and closing valve 60-3.

In addition, the confluent communication passage 54-2 is provided with a confluent opening and closing valve 61 as an opening and closing valve, and the confluent positive pressure communication passage 55-2 is provided with a confluent positive pressure opening and closing valve 62 as an opening and closing valve.

Thus, the communication passages 54, 55, 54-2, and 55-2 of the chuck table 31 are provided with the opening and closing valves 59-1, 59-2, 59-3, 60-1, 60-2, 60-3, 61, and 62, the one ends of the communication passages 54, 55, 54-2, and 55-2 open in the bottoms of the central recessed portion 52, the first annular recessed portion 53-1, the second annular recessed portion 53-2, and the third annular recessed portion 53-3 in the upper surface 51 of the base 50, and the communication passages 54, 55, 54-2, and 55-2 are coupled to the decompressing pump 56 and the positive pressure source 58. The communication passages 54, 55, 54-2, and 55-2 thereby make a negative pressure or a positive pressure selectively act on regions of the surface 41 of the porous plate 40 which regions respectively correspond to the first region 321 and the second region 322. Therefore, the communication passages 54, 55, 54-2, and 55-2 that make the negative pressure or the positive pressure selectively act are connected to the regions of the surface 41 of the porous plate 40 which regions respectively correspond to the first region 321 and the second region 322. Incidentally, the regions respectively corresponding to the first region 321 and the second region 322 refer to regions of the surface 41 of the porous plate 40 which regions respectively coincide with the first region 321 and the second region 322 in the thickness direction of the porous plate 40.

The control unit 100 makes the wafer manufacturing apparatus 30 perform a processing operation on the SiC ingot 1-1 or 1-2, that is, a manufacturing operation on the wafer 11 by controlling the above-described constituent elements of the wafer manufacturing apparatus 30. Incidentally, the control unit 100 is a computer including an arithmetic processing device having a microprocessor such as a central processing unit (CPU), a storage device having a memory such as a read only memory (ROM) or a random access memory (RAM), and an input-output interface device. The arithmetic processing device of the control unit 100 performs arithmetic processing according to a computer program stored in the storage device, and outputs a control signal for controlling the wafer manufacturing apparatus 30 to the above-described constituent elements of the wafer manufacturing apparatus 30 via the input-output interface device.

The control unit 100 is connected with a display unit not depicted which is formed by a liquid crystal display device or the like displaying the state of the processing operation, an image, or the like, and an input unit not depicted which is used when an operator registers processing content information or the like. The input unit is formed by at least one of a touch panel provided to the display unit and an external input device such as a keyboard.

Figure 10:
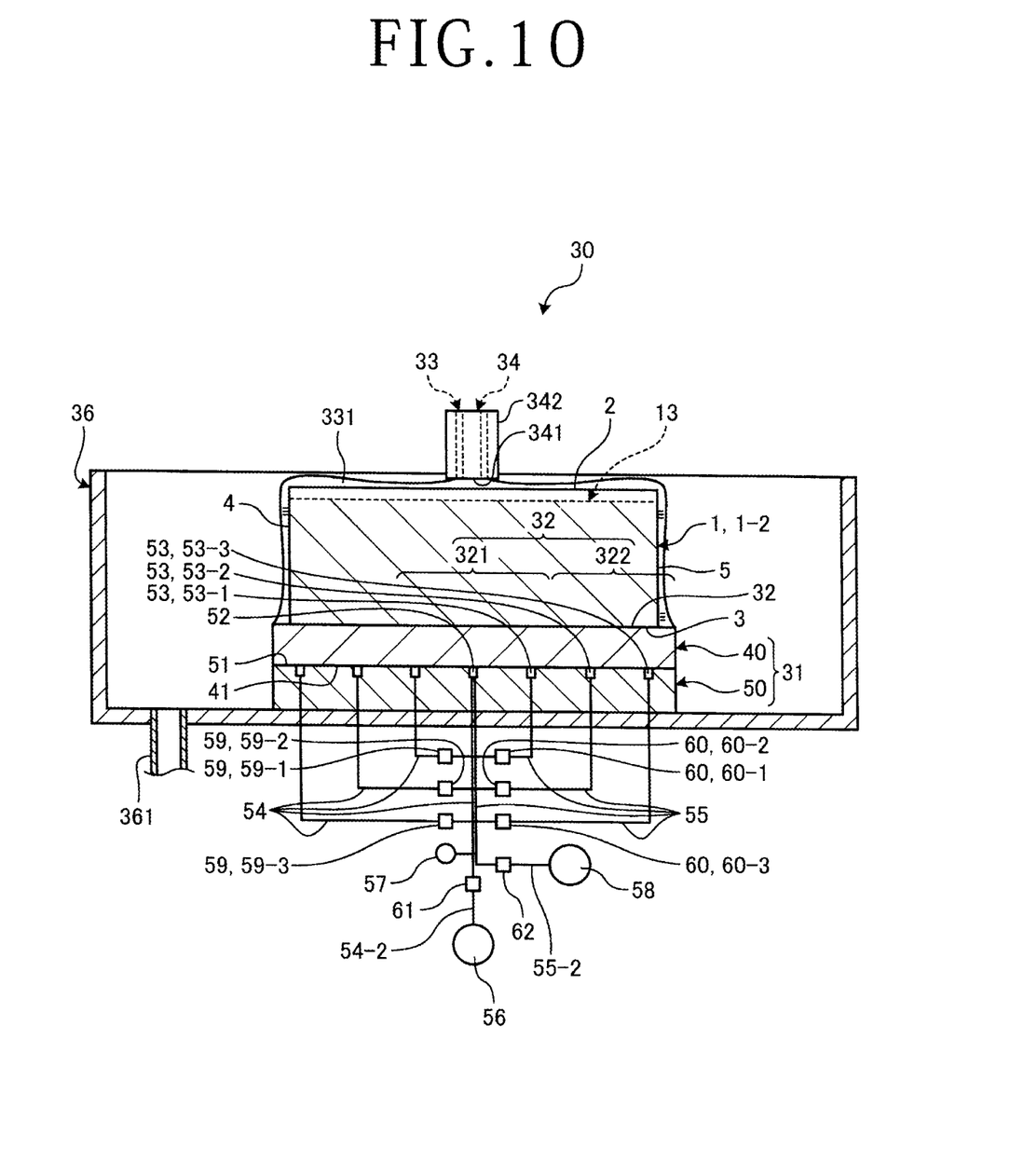
FIG. 10 is a sectional view schematically depicting the wafer manufacturing apparatus according to the embodiment at a time of processing a second SiC ingot.
Figure 11:
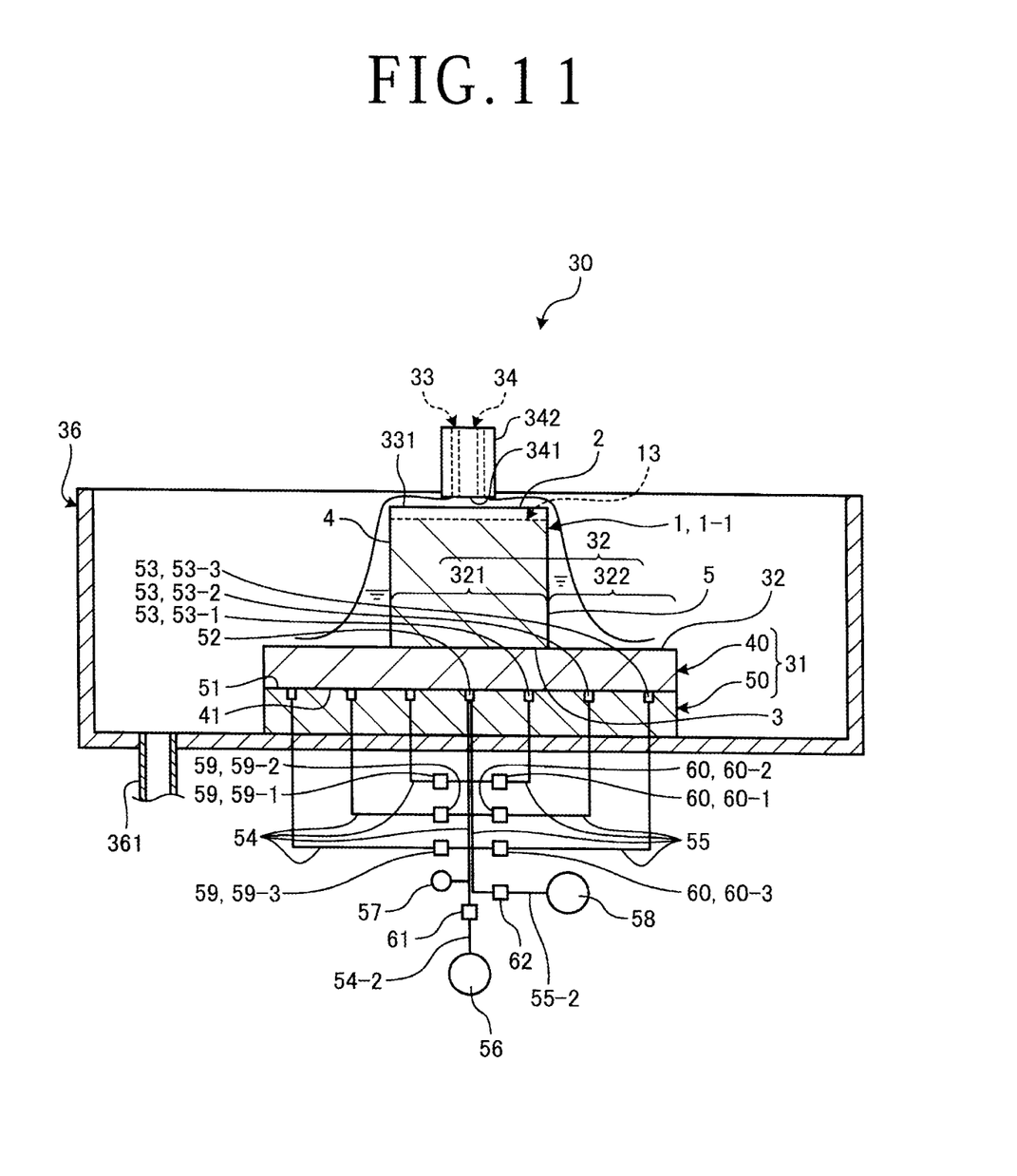
FIG. 11 is a sectional view schematically depicting the wafer manufacturing apparatus according to the embodiment at a time of processing a first SiC ingot.
Figure 12:
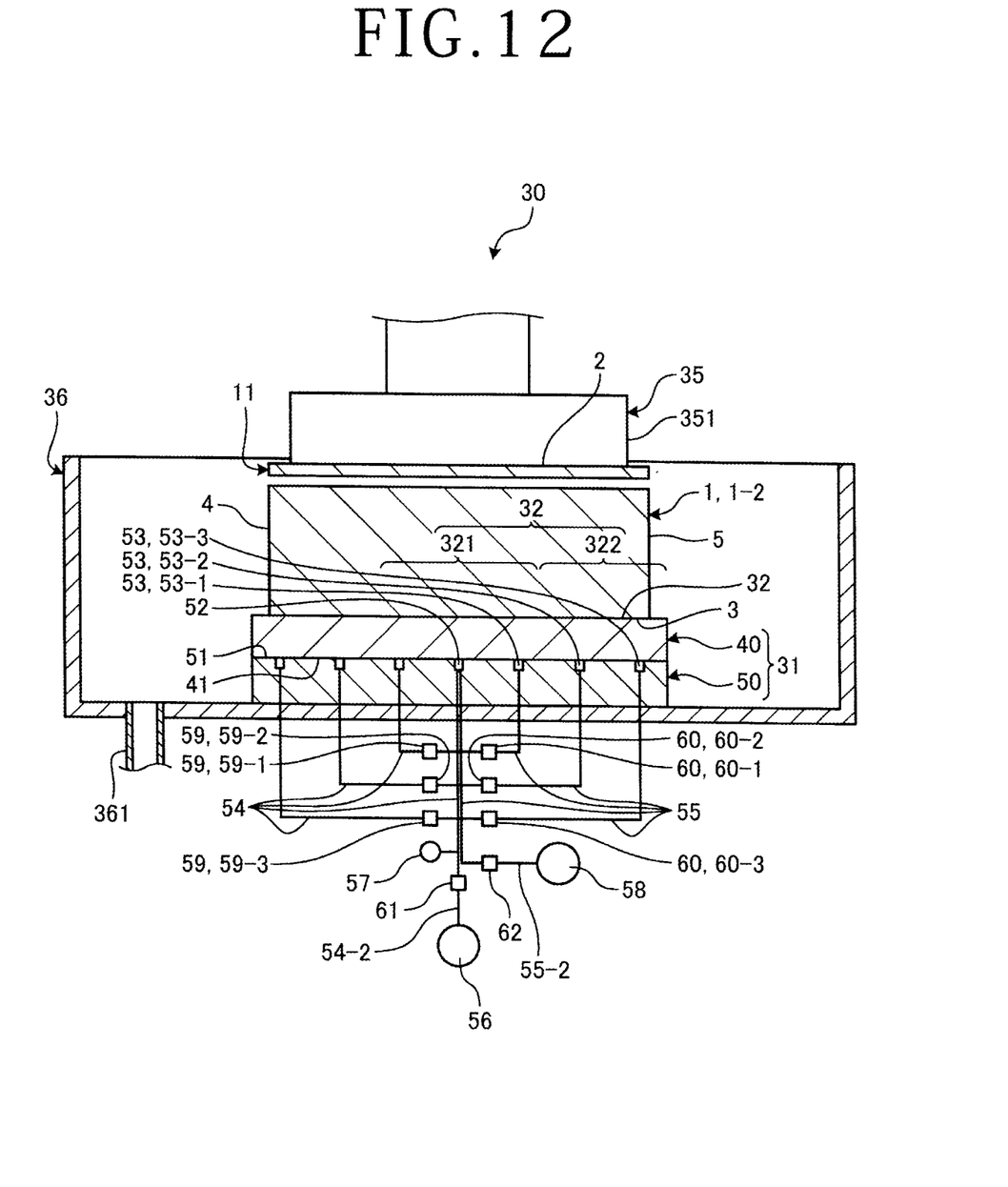
FIG. 12 is a sectional view schematically depicting the wafer peeled off from the second SiC ingot depicted in FIG. 10.

A processing operation of the wafer manufacturing apparatus 30 according to the embodiment will next be described with reference to the drawings. FIG. 10 is a sectional view schematically depicting the wafer manufacturing apparatus according to the embodiment at a time of processing the second SiC ingot. FIG. 11 is a sectional view schematically depicting the wafer manufacturing apparatus according to the embodiment at a time of processing the first SiC ingot. FIG. 12 is a sectional view schematically depicting the wafer peeled off from the second SiC ingot depicted in FIG. 10.

The wafer manufacturing apparatus 30 according to the embodiment starts the processing operation when the second surface 3 of the SiC ingot 1-1 or 1-2 in which the peeling layer 13 is formed is mounted on the suction surface 32 of the chuck table 31, the control unit 100 receives processing content information via the input unit and stores the processing content information in the storage device, and the control unit 100 receives a processing start instruction from the operator. Incidentally, the processing content information includes information indicating whether the processing target is the first SiC ingot 1-1 or the second SiC ingot 1-2.

In the processing operation, the wafer manufacturing apparatus 30 opens or closes the opening and closing valves 59-1, 59-2, 59-3, 60-1, 60-2, 60-3, 61, and 62 according to whether the processing target is the first SiC ingot 1-1 or the second SiC ingot 1-2, and thereby sucks and holds the SiC ingot 1-1 or 1-2 as the processing target on the suction surface 32. Incidentally, as depicted in FIG. 10, in a case where the processing target is the second SiC ingot 1-2, the wafer manufacturing apparatus 30 opens the opening and closing valves 59-1, 59-2, 59-3, and 61, and closes the opening and closing valves 60-1, 60-2, 60-3, and 62.

In addition, as depicted in FIG. 11, in a case where the processing target is the first SiC ingot 1-1, the wafer manufacturing apparatus 30 opens the opening and closing valves 59-1, 60-2, 60-3, 61, and 62, and closes the opening and closing valves 59-2, 59-3, and 60-1. Thus, when the wafer manufacturing apparatus 30 sucks and holds the first SiC ingot 1-1 on the suction surface 32 of the chuck table 31, the wafer manufacturing apparatus 30 makes a negative pressure act by the communication passages 54 whose one ends open in the central recessed portion 52 and the first annular recessed portion 53-1 connected to the first region 321, and makes a positive pressure act by the positive pressure communication passages 55 whose one ends open in the second annular recessed portion 53-2 and the third annular recessed portion 53-3 connected to the second region 322.

In addition, in the embodiment, as depicted in FIG. 10 and FIG. 11, when the SiC ingot 1-1 or 1-2 is sucked and held on the suction surface 32 of the chuck table 31, the pressure value measured by the pressure gage 57 is in a second predetermined range in which both of a lower limit value and an upper limit value are lower than those of the above-described predetermined range. In the embodiment, the second predetermined range is between −90 kPa (gage pressure) and −70 kPa (gage pressure), for example.

In the processing operation, the wafer manufacturing apparatus 30 lowers the water supply unit 33 and the ultrasonic oscillating unit 34 and brings the water supply unit 33 and the ultrasonic oscillating unit 34 close to the first surface 2 of the SiC ingot 1-1 or 1-2 held on the chuck table 31, supplies the water 331 to the first surface 2 of the SiC ingot 1-1 or 1-2 held on the chuck table 31 from the water supply unit 33, and thereby immerses the end surface 341 of the ultrasonic oscillating unit 34 in the water 331 on the first surface 2 of the held SiC ingot 1-1 or 1-2. The pressure value measured by the pressure gage 57 at this time is in the second predetermined range. Thus, because the porous plate 40 of the chuck table 31 is formed by a porous ceramic in which porosity is equal to or more than 40% and equal to or less than 70% as a volume ratio and the diameter of vent holes formed by pores is equal to or more than 10 μm and equal to or less than 25 μm, a difference between measured values of the pressure gage 57 when the decompressing pump 56 is actuated in a state in which nothing is mounted on the suction surface 32 and in a state in which the SiC ingot 1-1 or 1-2 is placed on the suction surface 32 is equal to or more than a difference between the predetermined range and the second predetermined range, that is, 5 kPa.

In addition, in the processing operation, the water 331 supplied to the first surface 2 of the SiC ingot 1-1 or 1-2 by the water supply unit 33 flows over the first surface 2, and goes downward along the peripheral surface 4 of the SiC ingot 1-1 or 1-2. The water 331 flows over the suction surface 32 exposed on the periphery of the SiC ingot 1-1 or 1-2, goes along the peripheral surface of the chuck table 31, and is received by the water receiving unit 36. The water 331 is then discharged from the discharge port 361. Thus, because the porous plate 40 is formed by a porous ceramic in which porosity is equal to or more than 40% and equal to or less than 70% as a volume ratio and the diameter of vent holes formed by pores is equal to or more than 10 μm and equal to or less than 25 μm, the chuck table 31 can suck and hold the SiC ingot 1-1 or 1-2 even in a state in which the area of the second surface 3 of the SiC ingot 1-1 or 1-2 is smaller than the area of the suction surface 32 and the water 331 flows over the suction surface 32 exposed on the periphery of the SiC ingot 1-1 or 1-2.

Incidentally, when the porosity of the porous ceramic forming the porous plate 40 is less than 40% as a volume ratio and the diameter of the vent holes formed by the pores is less than 10 μm, the SiC ingot 1-1 or 1-2 having the second surface 3 smaller in area than the area of the suction surface 32 cannot be sucked and held on the suction surface 32 with a sufficient suction force, even if a leakage of the negative pressure can be suppressed. In addition, when the porosity of the porous ceramic forming the porous plate 40 exceeds 70% as a volume ratio, and the diameter of the vent holes formed by the pores exceeds 25 μm, there is too much leakage of the negative pressure, and the SiC ingot 1-1 or 1-2 having the second surface 3 smaller in area than the area of the suction surface 32 cannot be sucked and held on the suction surface 32 with a sufficient suction force.

The wafer manufacturing apparatus 30 applies power to the ultrasonic vibrator of the ultrasonic oscillating unit 34 for a predetermined period of time, and thereby applies an ultrasonic wave to the first surface 2 of the SiC ingot 1-1 or 1-2 by the ultrasonic oscillating unit 34. Then, the ultrasonic wave from the ultrasonic oscillating unit 34 is applied to the first surface 2, stimulates the peeling layer 13, and ruptures the SiC ingot 1-1 or 1-2 over the entire surface of the wafer 11 to be manufactured with the peeling layer 13 as a starting point.

After applying the power to the ultrasonic vibrator of the ultrasonic oscillating unit 34 for a predetermined period of time, the wafer manufacturing apparatus 30 stops the supply of the water 331 by the water supply unit 33, opens the opening and closing valves 59-1, 59-2, 59-3, and 61, closes the opening and closing valves 60-1, 60-2, 60-3, and 62, and raises the water supply unit 33 and the ultrasonic oscillating unit 34. The wafer manufacturing apparatus 30 moves the peeling unit 35 to a position above the chuck table 31, lowers the peeling unit 35 above the chuck table 31, and brings the lower surface of the transporting pad 351 of the peeling unit 35 into contact with the first surface 2 of the SiC ingot 1-1 or 1-2 held on the chuck table 31.

The wafer manufacturing apparatus 30 sucks and holds the first surface 2 of the SiC ingot 1-1 or 1-2 held on the chuck table 31 by the lower surface of the transporting pad 351 of the peeling unit 35, and raises the peeling unit 35 as depicted in FIG. 12. The wafer manufacturing apparatus 30 peels the wafer 11 to be manufactured on the first surface 2 side from the SiC ingot 1-1 or 1-2, and takes out the SiC ingot 1-1 or 1-2 from the suction surface 32 of the chuck table 31. After the SiC ingot 1-1 or 1-2 is taken out from the suction surface 32 of the chuck table 31, the wafer manufacturing apparatus 30 supplies the pressurized gas from the positive pressure source 58 to the porous plate 40, that is, applies a positive pressure to the porous plate 40, by closing the opening and closing valves 59-1, 59-2, 59-3, and 61 and opening the opening and closing valves 60-1, 60-2, 60-3, and 62. The wafer manufacturing apparatus 30 thus jets the gas from the pores opening in the suction surface 32.

In addition, the control unit 100 of the wafer manufacturing apparatus 30 stores the predetermined range and the second predetermined range in advance, and after sucking and holding the SiC ingot 1-1 or 1-2 on the suction surface 32 of the chuck table 31, the control unit 100 determines whether or not the SiC ingot 1-1 or 1-2 specified by the processing content information is sucked and held on the suction surface 32 of the chuck table 31 on the basis of a measurement result of the pressure gage 57. Specifically, in a case where the processing target specified by the processing content information is the first SiC ingot 1-1, the control unit 100 determines that the first SiC ingot 1-1 is sucked and held on the suction surface 32 when the measurement result of the pressure gage 57 is within the second predetermined range after sucking and holding the SiC ingot 1-1 or 1-2 on the suction surface 32 of the chuck table 31, and the control unit 100 determines that the first SiC ingot 1-1 is not sucked and held on the suction surface 32 when the measurement result of the pressure gage 57 is outside the second predetermined range. Also in a case where the processing target specified by the processing content information is the second SiC ingot 1-2, the control unit 100 similarly makes the determination after sucking and holding the SiC ingot 1-1 or 1-2 on the suction surface 32 of the chuck table 31.

As described above, in the wafer manufacturing apparatus 30 according to the embodiment, the porosity of the porous ceramic forming the porous plate 40 is equal to or more than 40% and equal to or less than 70% as a volume ratio, and the diameter of the vent holes formed by the pores is equal to or more than 10 μm and equal to or less than 25 μm. Therefore, the wafer manufacturing apparatus 30 according to the embodiment can suck and hold the SiC ingot 1-1 or 1-2 having the second surface 3 smaller than the area of the suction surface 32 on the suction surface 32 of the chuck table 31 even in conditions in which the water 331 flows on the suction surface 32.

Hence, the wafer manufacturing apparatus 30 according to the embodiment includes the chuck table 31 that can suck and hold the SiC ingot 1-1 or 1-2 irrespective of the area of the second surface 3 of the SiC ingot 1-1 or 1-2 even in conditions in which the water 331 flows on the suction surface 32, and produces an effect of obviating a need for replacing the chuck table 31 according to the size of the SiC ingot 1-1 or 1-2. As a result, the wafer manufacturing apparatus 30 according to the embodiment produces an effect of being able to reduce replacement of the chuck table 31 even when the diameter 26-1 or 26-2 as the size of the SiC ingot 1-1 or 1-2 to be processed is changed.

In addition, in the wafer manufacturing apparatus 30 according to the embodiment, a difference between the pressure values measured when the decompressing pump 56 makes a negative pressure act on the suction surface 32 in a state in which there is nothing on the chuck table 31 and a state in which the SiC ingot 1-1 or 1-2 is mounted on the chuck table 31 is equal to or more than 5 kPa, and the pressure values thus differ from each other. As a result, the control unit 100 of the wafer manufacturing apparatus 30 can check whether the SiC ingot 1-1 or 1-2 is mounted on the suction surface 32 on the basis of the measurement result of the pressure gage 57.

In addition, the wafer manufacturing apparatus 30 according to the embodiment can make a positive pressure act from the suction surface 32 exposed on the periphery of the first SiC ingot 1-1, and can therefore prevent waste produced at a time of peeling from being sucked on the exposed suction surface 32. As a result, the wafer manufacturing apparatus 30 can suppress dirt on the suction surface 32.

[Modifications]

Figure 13:
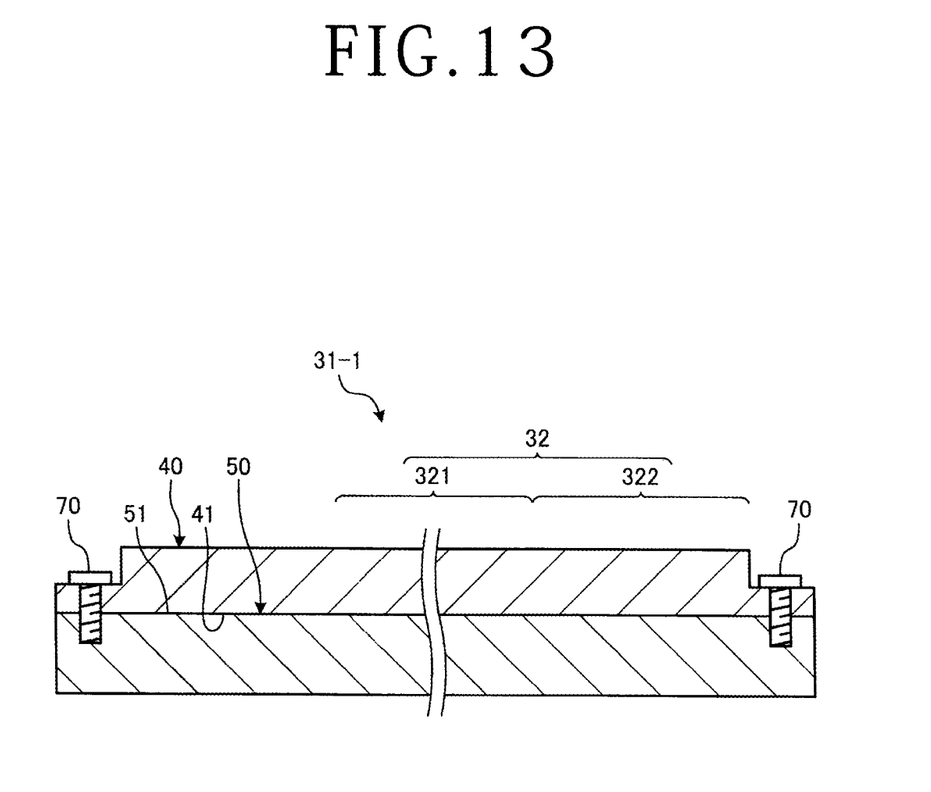
FIG. 13 is a sectional view schematically depicting a chuck table of a wafer manufacturing apparatus according to a modification of the embodiment.

A wafer manufacturing apparatus according to a modification of the embodiment of the present invention will be described with reference to the drawings. FIG. 13 is a sectional view schematically depicting a chuck table of the wafer manufacturing apparatus according to the modification of the embodiment. Incidentally, in FIG. 13, the same parts as in the embodiment are identified by the same reference numerals, and description thereof will be omitted.

As depicted in FIG. 13, the chuck table 31-1 of the wafer manufacturing apparatus 30 according to the modification depicted in FIG. 13 is the same as in the embodiment except that the porous plate 40 and the base 50 are fixed to each other by bolts 70. Incidentally, while FIG. 13 omits the recessed portions 52, 53-1, 53-2, and 53-3 of the base 50, the communication passages 54, 54-2, 55, and 55-2, and the opening and closing valves, the chuck table 31 in the present invention includes the recessed portions 52, 53-1, 53-2, and 53-3 and the communication passages 54 as in the embodiment.

The wafer manufacturing apparatus 30 according to the modification includes the chuck table 31-1 that can suck and hold the SiC ingot 1-1 or 1-2 irrespective of the area of the second surface 3 of the SiC ingot 1-1 or 1-2 even in conditions in which the water 331 flows on the suction surface 32. As a result, as in the embodiment, the wafer manufacturing apparatus 30 according to the modification produces an effect of being able to reduce replacement of the chuck table 31-1 even when the diameter 26-1 or 26-2 as the size of the SiC ingot 1-1 or 1-2 to be processed is changed.

In addition, the wafer manufacturing apparatus 30 according to the present invention may open the opening and closing valves 59-1, 59-2, 59-3, and 61 and close the opening and closing valves 60-1, 60-2, 60-3, and 62 after the processing target is mounted on the suction surface 32, and the control unit 100 may control the opening and closing of the opening and closing valves 59-1, 59-2, 59-3, 60-1, 60-2, 60-3, 61, and 62 on the basis of the measurement result of the pressure gage 57. Specifically, after the processing target is mounted on the suction surface 32, the wafer manufacturing apparatus 30 according to the present invention opens the opening and closing valves 59-1, 59-2, 59-3, and 61 and closes the opening and closing valves 60-1, 60-2, 60-3, and 62, and when the measurement result of the pressure gage 57 is within the second predetermined range, the control unit 100 continues the processing operation while maintaining a state in which the opening and closing valves 59-1, 59-2, 59-3, and 61 are opened and the opening and closing valves 60-1, 60-2, 60-3, and 62 are closed.

After the processing target is mounted on the suction surface 32, the wafer manufacturing apparatus 30 according to the present invention opens the opening and closing valves 59-1, 59-2, 59-3, and 61, and closes the opening and closing valves 60-1, 60-2, 60-3, and 62, and when the measurement result of the pressure gage 57 is outside the second predetermined range, the control unit 100 closes the third opening and closing valve 59-3 and opens the third positive pressure opening and closing valve 60-3 and the confluent positive pressure opening and closing valve 62, and the control unit 100 determines whether or not the measurement result of the pressure gage 57 is within the second predetermined range again.

Thus, after the processing target is mounted on the suction surface 32, the wafer manufacturing apparatus 30 according to the present invention opens the opening and closing valves 59-1, 59-2, 59-3, and 61 and closes the opening and closing valves 60-1, 60-2, 60-3, and 62, and until the measurement result of the pressure gage 57 falls within the second predetermined range, the control unit 100 closes the opening and closing valves 59-1, 59-2, and 59-3 provided to the communication passages 54 whose one ends open in the annular recessed portions 53-1, 53-2, and 53-3 in order starting from an outer circumferential side, and opens the confluent positive pressure opening and closing valve 62 and opens the positive pressure opening and closing valves 60-1, 60-2, and 60-3 provided to the positive pressure communication passages 55 whose one ends open in the annular recessed portions 53-1, 53-2, and 53-3 in order starting from the outer circumferential side.

In this case, in addition to the effects of the embodiment, the wafer manufacturing apparatus 30 opens the opening and closing valves 59-1, 59-2, 59-3, and 61 and closes the opening and closing valves 60-1, 60-2, 60-3, and 62 after the processing target is mounted on the suction surface 32, and the control unit 100 controls the opening and closing of the opening and closing valves 59-1, 59-2, 59-3, 60-1, 60-2, 60-3, 61, and 62 such that the measurement result of the pressure gage 57 falls within the second predetermined range. Thus, the wafer manufacturing apparatus 30 can properly suck and hold the SiC ingot 1-1 or 1-2 of any size on the suction surface 32 of the porous plate 40 of the chuck table 31. As a result, the wafer manufacturing apparatus 30 produces an effect of being able to further reduce replacement of the chuck table 31 even when the diameter 26-1 or 26-2 as the size of the SiC ingot 1-1 or 1-2 to be processed is changed.

It is to be noted that the present invention is not limited to the foregoing embodiment. That is, the present invention can be modified and carried out in various manners without departing from the gist of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer manufacturing apparatus for manufacturing a wafer from a semiconductor ingot in which a peeling layer is formed by positioning a condensing point of a laser beam of a wavelength transmissible through the semiconductor ingot at a depth corresponding to a thickness of the wafer to be manufactured, and applying the laser beam, the wafer manufacturing apparatus comprising:
    a chuck table configured to hold the semiconductor ingot on a suction surface with the wafer to be manufactured on an upper side;
    an ultrasonic oscillating unit having an end surface that faces the wafer to be manufactured, and configured to oscillate an ultrasonic wave;
    a water supply unit configured to supply water between the wafer to be manufactured and the end surface of the ultrasonic oscillating unit;
    a peeling unit configured to suck and hold the wafer to be manufactured, and peel the wafer to be manufactured from the semiconductor ingot; and
    a water receiving unit configured to surround the chuck table, and receive the water discharged after being supplied from the water supply unit to the semiconductor ingot and flowing on the suction surface of the chuck table on a periphery of the semiconductor ingot,
    the chuck table including a porous plate forming the suction surface and a base supporting the porous plate and having a communication passage configured to make a negative pressure act on the porous plate, and
    the chuck table sucking and holding the semiconductor ingot even in a state in which an area of a bottom surface of the semiconductor ingot is smaller than an area of the suction surface and the water flows on the suction surface exposed on the periphery of the semiconductor ingot.

2. The wafer manufacturing apparatus according to claim 1, wherein
    the suction surface of the porous plate has a first region corresponding to a first semiconductor ingot having a first diameter and a second region surrounding the first region,
    communication passages configured to make a negative pressure or a positive pressure act selectively are connected to regions corresponding to the first region and the second region, respectively, in a surface of the porous plate, the surface being on an opposite side from the suction surface, and
    when the first semiconductor ingot is sucked and held, the negative pressure is made to act by the communication passage connected to the first region, and the positive pressure is made to act by the communication passage connected to the second region.

3. The wafer manufacturing apparatus according to claim 1, wherein
    a decompressing pump as a suction source is coupled to the communication passage of the chuck table, a pressure gage is installed on the communication passage, and a difference between measured values of the pressure gage when the decompressing pump is actuated in a state in which nothing is mounted on the suction surface of the porous plate and in a state in which the semiconductor ingot is placed on the suction surface of the porous plate is equal to or more than 5 kPa.

* * * * *